CHARLES W. SKARSTROM INVENTOR

BY David A. Roth

PATENT ATTORNEY

CHARLES W. SKARSTROM INVENTOR

BY David A. Roth

PATENT ATTORNEY

CHARLES W. SKARSTROM INVENTOR

BY David A. Roth

PATENT ATTORNEY

CHARLES W. SKARSTROM INVENTOR
BY David A. Roth
PATENT ATTORNEY

CHARLES W. SKARSTROM INVENTOR
BY David A. Roth
PATENT ATTORNEY 3,274,751
Patented Sept. 27, 1966

3,274,751

PROCESSING OF GASES FLOWING INTO AND OUT OF AN ENCLOSED SPACE

Charles W. Skarstrom, Montvale, N.J., assignor to Esso Research and Engineering Company, a corporation of Delaware Filed May 20, 1963, Ser. No. 281,874
18 Claims. (Cl. 55—33)

This invention relates to the transfer of gases into and out of an enclosed space. In particular, it relates to methods for transferring gases, e.g., air, into and out of an enclosed space so as to cause the space to be ventilated. Even more particularly, it relates to the transfer of gas, e.g., air, into and out of an enclosed space while minimizing the transfer of heat into and out of said enclosed space. With even greater particularity, the invention relates to the transfer of gas, e.g., air masses, into and out of an enclosed space while minimizing the transfer of heat into and out of an enclosed space and controlling the transfer of moisture into and out of an enclosed space. Moreover, the invention relates to moisture control without accompanying minimization of heat transfer.

The transfer of gaseous masses into and out of an enclosed space while minimizing heat transfer into and out of the enclosed space and controlling the transfer of moisture into and out of the enclosed space finds particular application for ventilation and the control of the environmental conditions within the closed space. This type of ventilation and control is suitable for use for human beings, animals, stored perishable items such as vegetables, flowers, foodstuffs of all varieties, stored volatile materials, and the like.

As an example of the application of this invention there will be some discussion concerning ventilation of habitable rooms with respect to human requirements. However, it is to be understood that the invention has much wider application than ventilation solely for human beings.

It is generally accepted that adequate ventilation for one person is approximately 5 to 15 s.c.f./min. of fresh air. Smokers need anywhere from 20 to 30 s.c.f./min. of fresh air. Furthermore, when considering aspects of ventilation, the seasons must be kept in mind. For instance, in the summertime the problem is to maintain a cool room, sometimes with the aid of air conditioners while, at the same time, bringing in a mass of fresh, often moist, hot air. It can be readily appreciated that, as energy is expended cooling a room which is static, an appreciably greater expenditure of energy is necessary to cool a room which is being adequately ventilated. Conventional air conditioners do not ordinarily cope with the dual problem of both cooling and ventilating, because of cost considerations. Consequently, they normally cool a room or other closed area when the ventilating is restricted to a lesser degree than the desired level discussed above. Usually, in the summer it is desirable that a room be dehumidified. The warm, moist air also places an extra load on dehumidifying facilities.

In the wintertime the problem is the opposite. Here the room is usually heated and it is desired to maintain a certain normal humidity and temperature within the room. Usually, the outdoor air is cool and has a low water content. Thus, bringing in copious quantities of outside winter air for ventilation places a burden on conventional heating and humidifying facilities.

In sum then, the introduction of adequate fresh air in a room for human habitation regulated by conventional heating or cooling facilities places an extra burden on these facilities.

It has now been discovered and forms an important feature of the instant invention, that an effective heat barrier can be formed between an enclosed space and its environment which barrier allows the transfer of relatively large volumes of gas between the enclosure and its surroundings with a minimum transfer of heat therebetween.

As an additional feature of the invention it has been discovered that the moisture transferred in and out of an enclosed area can be controlled while maintaining the heat barrier. Thus, the transfer of relatively large volumes of gases between an enclosed area and its surroundings can be accomplished while minimizing heat transfer and controlling moisture transfer.

In essence, the minimization of heat transfer feature of the invention permits the flow of large masses of air between an enclosed space and a region with a small net heat flow between the two. Another facet of the invention involves the flow of large masses of gas between an enclosed space and a region with a small net heat flow between the two, as well as a controlled moisture flow between the two. Thus, another preferred embodiment of the invention permits a gas or air mass transport into and out of an enclosed space without corresponding heat transport and with control of water vapor transport.

HEAT BARRIER

The process of the invention as applied to a heat barrier involves the use of sensible heat exchangers preferably those of the metal maze, granule, or bead type. These types of heat exchangers are well known to the art. They are based on the concept that as a gaseous mass is flowed through the heat exchanger, which either has a heat capacity in and of itself or is filled with materials such as granules or beads, i.e., glass beads having a relatively high heat capacity, the relative heat or cold of the gaseous medium is transferred to the heat exchanger.

If the gas is cooler than the heat exchanger, the tendency will be for the heat exchanger to become cooler and the gas warmer. If the gas is warmer than the heat exchanger, the tendency will be for the heat exchanger to become warmer and the gas to become cooler.

In a preferred embodiment of the invention, two heat exchange beds, i.e. heat exchangers forming passageways, communicate between two discrete regions. In such a preferred version of the invention, one region is a closed, inhabitable space, and the other area is an exterior area which does not necessarily have to be closed. It is desired to control the conditions within the closed area, preferably an inhabitable area, without much concern about the conditions in the nonclosed area, i.e. the outdoors. The enclosed space, for example, can be a room, greenhouse, warehouse, silo, building, structure, tent, cave, automobile, train, plane, and the like. The enclosed space can be referred to as an enclosure, compartment, chamber, enclosed cavity, and the like. It is preferably gastight although some leakage will usually be inevitable and can be tolerated.

It is to be understood that the invention is broad enough in concept to contemplate its use when the flow of gas masses is between one or more enclosed spaces, where the conditions within the enclosed areas should be controlled.

The two heat exchangers connecting the enclosed space with the outer region are preferably operated simultaneously so that the flow of gas through one heat exchanger going into the closed area equals the flow of gas through the other heat exchanger coming out of the closed area. Thus, the average pressure within the two heat exchangers can be substantially the same all the time.

For example, a pair of heat exchangers connecting a cool, dry region with a hot, moist region or vice versa can inhibit heat transfer between the two regions. It will be understood that this facet of the invention has utility only when there is a temperature difference between the enclosed space and another region.

The gas flow, in through one bed and out through the other bed is periodically reversed prior to substantial heat or cold breakthrough. The flows through each bed are regulated so that the mass flow through each bed is substantially the same. Thus, the flows are regulated so that heat transfer between the enclosed space and another region is minimized. Additionally, the heat flow which is carried by the mass flow is also the same.

HEAT BARRIER PLUS MOISTURE CONTROL; MOISTURE CONTROL ALONE

Assuming, for illustrative purposes, that the enclosed space is a room for human habitation and the other region is the outdoors and that the gas being transferred through the beds is air, the partial pressure of the water vapor in the two regions will ultimately equalize unless there is a source or sink of $H_2O$ in the room.

Therefore, although the above-described process effects an efficient heat barrier between an enclosed space and another region while ventilating, it does not control the flow of water vapor in and out of the enclosed space. As an additional feature of the invention, a technique has been developed which not only minimizes the transfer of heat in and out of an enclosed space but also can control the transfer in and out of the enclosed space of water vapor or other gaseous component or impurity whose movement it is desired to control.

The method of controlling water vapor transfer as well as minimizing heat transfer involves the use of materials such as adsorbents, absorbents, complexing agents, desiccants, and the like, in place of the granules or beads of the heat exchangers already described. Such materials cannot only be used to control the transfer of $H_2O$ vapor but can, depending on their selection, also remove impurities such as $CO_2$, ethylene, various hydrocarbon pollutants such as those from industrial smoke stacks and automobile exhausts, dust, pollen, bacteria, poison gases, and the like. Examples of these materials include commercially available materials such as activated alumina, activated carbon, silica gel, natural or synthetic crystalline zeolites, glass, (i.e. Vicor type) molecular sieves, synthetic ion exchange resins and the like.

With respect to the control of water vapor transport there are several considerations. When there is no temperature difference between an enclosed space and adjacent region there is no utility in inhibiting heat transfer but it may be still desirable to control water vapor transfer.

Speaking in terms of human comfort within an enclosed space, in the winter relatively more water vapor is required therein as compared with outdoors than is required in the summer. This is because in the winter the warm air of the room is relatively more comfortable when it contains more water than the air (cold) outdoors that is coming into the room. Conversely, in the summer, the cool air of the room is relatively more comfortable with less water vapor in it than contained by the warm air outside.

Thus, in a situation where moisture control is desired, summertime moisture from outside is desirably prevented from entering the room and moisture generated within the room is allowed to leave the room or is eliminated from the room by the use of a moisture sink such as a dehumidifier. In winter, water vapor can be brought into the room from outside, the water vapor within the room can be conserved by preventing its leaving the room, and perhaps an additional humidification source within the room will be required.

To control water vapor transfer it has been found that an additional factor can be introduced into the ventilation process. This factor can be introducted in either of two ways.

The first is to provide a small additional *dry* gas air flow to the gas flow which ordinarily leaves a relatively cool, dry region, i.e. a room for human summer habitation. This small additional air flow is in addition to that flow of air leaving the area which matches the volume of air coming into the area. This small, dry air flow can be provided from any conventional source. A convenient method of providing dry air is a heatless adsorber as described in U.S. Patent 2,944,627.

In lieu of providing the small amount of extra dry air from an exterior source it is possible to achieve essentially the same effect by providing a dehumidifier within the cool, dry enclosed space. In a room a conventional dehumidifier could be used. Since the moisture coming from outside into the enclosed space, i. e. the room, is being caught by the adsorbent, a relatively small amount of dehumidification is needed in comparison with the amount of ventilation being obtained. When using the dehumidifier technique it is to be understood that the volume of gas which flows into the enclosed space of concern and out of the enclosed space of concern is substantially the same in both directions through both adsorbent beds. It must also be recognized that when the dehumidifier technique is used, some heat is usually generated by the dehumidification in the cool region and must be offset by additional air conditioning or other mechanical refrigeration, or by a special dehumidifier which has only its cooling coil inside the room.

The first described technique using the extra dry air or gas is an important aspect of the invention since, unexpectedly, the blending action of the dry air is substantially more effective than could be predicted. The excess dry air tends to create a driving force which drives the moisture or other contaminant out of the room. This is especially so when the beds have a relatively short length of material (adsorbent). Short length beds are a little inefficient with respect to heat transfer but are very advantageous from the standpoint of relatively little pressure drop and the elimination of moisture from a room during the summer.

In this description of the invention, two related but discrete concepts are involved. One involves heat exchange within two beds containing an adsorbent material which also has some heat capacity. The other involves heat exchange within two beds which are preferably packed with a material of relatively high heat capacity but not necessarily having any adsorptive capacity or other ability to prevent passage of a given component.

Beds having a relatively high heat capacity or those which are packed with a material having a relatively high heat capacity, are referred to herein as normal regenerators. The beds packed with adsorbent material are referred to herein as adsorbent regenerators. The base principle of the regenerator is known to the art for use in separating the components of air by liquefaction. See, for instance, pages 82–88 of the book entitled, "The Separation of Gases" by M. Ruhemann, 2d ed. 1949 by Oxford University Press, Amen House, London EC 4. In general, the theory of a regenerator involves the following.

Heat is to be exchanged between a warm gas and a cold gas. The two gaseous streams are passed through two regenerators in opposite directions for a short time. Then the directions of flow are reversed. Thus, each regenerator is traversed ultimately by each gas stream. For instance, a warm stream passes from top to bottom and a cold stream from bottom to top. In a given period or cycle a cold stream cools the packing material and in the next cycle the cold is transferred to a warm gas. Regenerators are conventionally packed with flat discs, made from corrugated aluminum, glass beads, and the like. The adsorbent regenerator of this invention is not believed to be known by the art. It is somewhat similar in operation to the regenerator. However, the packing is a material having some adsorbtive properties with respect to a given component as compared with the nonadsorbent aluminum or glass beads. The term regenerator is generic to both regenerator and adsorbent regenerator.

SINGLE BED APPLICATIONS

A. *Ventilation*

Although the invention has so far been described in terms of two vessels, i. e. two regenerator beds, it is to be understood that it can also be carried out with only one vessel. For instance, in a structure having some flexibility, such as a tent, air is pumped into the structure through a regenerator bed. The air within the room is allowed to come back out of the flexible enclosed space through the regenerator bed by first passing through a pressure reducing means such as an orifice. This causes the air to expand and come out through the regenerator bed at a lower pressure but having a volume approximately equal to that of the entering air which is at a higher pressure. The same effect can be achieved without pressure reducing means by supplying an additional small clean gas, i. e. dry air, flow or providing a sink for the impurity, i. e. moisture.

B. *Gas masks*

The unusual and unexpected blending properties of the dry air flow can be used effectively in a novel gas mask. The material in the main canister is preferably one that is nonselective toward moisture and $CO_2$. It is, of course, selective to poison gases or pollutants so that these cannot pass through. The inhalation of breath draws air through the canister catching poisons. The total of the exhalation of breath plus a small dry air flow forces the poisons off the mask. Thus a mask can be used for a relatively long time without danger of exceeding the capacity of the material in the canister.

ABSENCE OF $CO_2$ BACKUP

One problem which might be expected in the actual use of the ventilation system of the invention when applied to a room holding animals or humans is $CO_2$ backup. By this is meant the potential danger that $CO_2$ expelled by animals or human beings will be caught by the regenerator bed or beds and not allowed to escape from the enclosed space within which the animals or human beings are staying. Fortunately, it has been discovered that $CO_2$ backup in the process of the invention is practically nil while retaining the properties of minimization of heat transport and control of water vapor. Thus, the heatless ventilation concept of the invention is eminently practical since it can be made to preferentially ventilate $CO_2$.

The invention can be fully understood by referring to both the preceding and following descriptions, the claims taken in conjunction therewith and by the accompanying drawings wherein:

FIGURE 1 is a schematic diagram of an apparatus and a process illustrating the use of the regenerator type heat exchanger beds to ventilate a closed area while maintaining a temperature difference.

FIGURE 2 is a schematic diagram illustrating an apparatus and process for carrying out the adsorbent-regenerator bed type concept of the invention to ventilate a closed area while minimizing the transfer of heat and controlling moisture transfer. FIGURE 2 also shows the provision for the use of a small flow of dry air which is an optional additional feature. In lieu of the small, dry air flow a dehumidifier, i. e. moisture sink, can be used.

Figure 1:
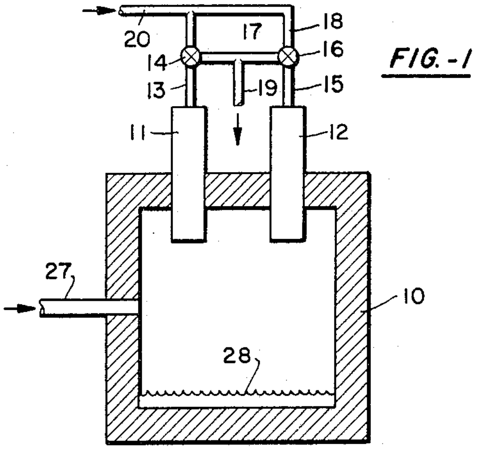

Referring now to FIGURE 1, a closed area 10 is shown having two regenerators 11 and 12 attached thereto; the regenerators have an upper end and a lower end; the upper ends are without closed area 10 and the lower ends are within closed area 10. The regenerators for the purpose of this illustration are packed with glass beads approximately ¼" in diameter.

In general, the ratio of regenerator volume to closed area volume is determined depending on the various individual problems encountered such as room ventilation for human habitation, winter conditions, summer conditions, ventilation of refrigerated areas, storage areas, and the like.

The regenerators are so constructed as to allow gases within the closed area to pass out freely and to allow gases without the closed area to pass in freely. One way of regulating gas flow between the closed area and the exterior is as follows:

Attached to the top of regenerator 11 is line 13 which is attached to valve 14. Attached to the upper end of regenerator 12 is line 15 which connects regenerator 12 with valve 16. Connecting valves 16 and 14 to each other are lines 17 and 18. Line 19 is connected to line 17 with a T connection. Line 19 is not connected to line 18. Line 20 is connected to line 18 with a T connection.

For the purpose of this particular embodiment, assume that air masses are being transported and assume that the air outside closed area 10 is hot and assume that the air inside closed area 10 is relatively cool compared with the outside air. It is desired to ventilate closed area 10 without substantially altering the temperature and humidity of closed area 10.

In a typical operation of this nature relatively hot air flows through line 20 into line 18 and then into valve 14, line 13, and through regenerator 11 into closed area 10. Much of the sensible heat of the air is transferred to the packing of the regenerator. Simultaneously, air from closed area 10 flows through regenerator 12, line 15, valve 16, line 17 and out through line 19. Thus, a flow of cool air flows out of closed area 10 and into line 18. The coolness is transferred to the glass packing of the regenerator.

When the cycle is reversed a flow of hot air enters line 20, flows through line 18 into valve 16, through line 15 and through regenerator 12, into closed area 10. This air is cooled by the residual coolness on the regenerator 12 packing. Simultaneously, cool air from within closed area 10 exits through regenerator 11, is warmed by the residual warmth on the packing of regenerator 11, and passes out through line 13, valve 14, line 17, and through line 19. The cycles are reversed prior to heat breakthrough.

Figure 2:
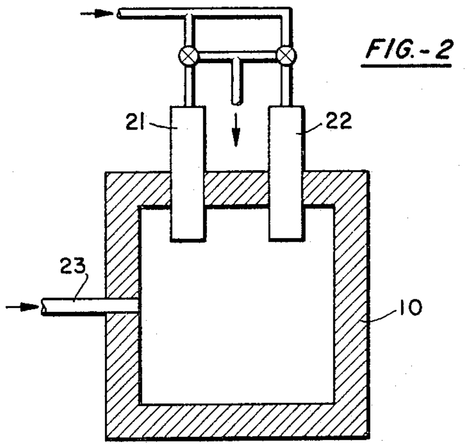

Referring now to FIGURE 2, closed area 10 is the same as that of FIGURE 1; and the valves and lines 13–20 are also the same as for FIGURE 1. The beds are now 21 and 22 and are packed with an adsorbent. For the purpose of this embodiment the adsorbent is a desiccant, preferably silica gel. The basic operation is indentical to that disclosed for FIGURE 1. Closed area 10 also has in it a conduit 23 through which a flow of dry air can be introduced. As an additional, but optional, feature it will be understood that the dry air could also be furnished by a source within closed area 10.

In operation, the process applied to the apparatus of FIGURE 2 is identical to that described for FIGURE 1 except that the flow of gas from within closed area 10 to the outside of closed area 10 is greater than the flow of gas from outside closed area 10 to inside closed area 10. The difference between the two flows is the amount of dry air entering closed bed 10 through conduit 23.

Figure 3:
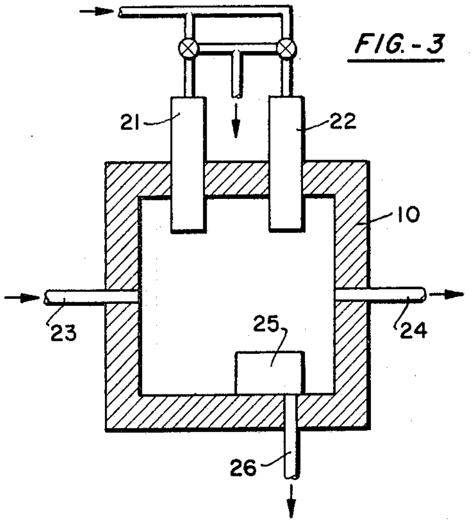
FIGURE 3 is a diagram of a process and apparatus illustrating the embodiment of the invention where an adsorbent regenerator heat exchanger is used in conjunction with dehumidification within a closed area.

Referring now to FIGURE 3, the apparatus is similar to that of FIGURE 2 except that conduit 24 has been added. In lieu of conduit 24 a mechanical dehumidifier 25 can be provided within closed area 10. Dehumidifier 25 communicates with the exterior of area 10 by means of conduit 26. The process sequence for the apparatus of FIGURE 3 is similar to that described for FIGURES 1 and 2 except that a dehumidifying effect is simulated by introducing a small flow of dry air through conduit 23 and bleeding off a corresponding amount of gas from within closed area 10 through conduit 24. The dehumidifying need not be simulated in this manner. It can also be accomplished by the action of an ordinary mechanical dehumidifier 25 which takes moisture out of closed area 10, liquefies it, and conveys the moisture outside of area 10 through conduit 26.

It can readily be appreciated that the concepts described above are not only admirably suited for ventilation of habitable living areas but can also be used for such things as cooling, and ventilation of regions which are not primarily designed for human habitation. For example, areas such as barns for animals or greenhouses or refrigerated storage areas, or the like, can be benefited by the ventilation technique of the invention.

Another important facet of the invention is that of freeze drying materials or cooling an area. When either freeze drying of materials or cooling a closed area is desired, dry, warm air can be introduced into closed area 10 by a conduit 27. This dry, warm air then passes over a material shown schematically as 28 and supplies a driving force for evaporation as well as a sweeping and pumping action for removal. Water vapor built up in closed area 10 is discharged through the regenerators. The same principle can be used in the apparatus of FIGURES 1, 2 or 3 for cooling closed area 10 by allowing either the flow of dry air through either conduits 23 or 27 or the input of regenerators 11 and 12 and absorbent regenerators 21 and 22 to pass over or through a body of liquid such as water. The liquid will be evaporated thus causing a cooling effect. The coolness can be retained by the apparatus of FIGURE 1. Both coolness and moisture gradient can be retained by the apparatus of FIGURES 2 and 3.

Also, more effective dehumidification by mechanical refrigeration can be accomplished by the process and apparatus of the invention if cold evaporator coils are placed within closed area 10. The dried effluent is recovered at the same temperature it went in. The regenerator beds catch and reuse the cold. Effluent dew points below 32° F. would be difficult to obtain because of the ice defrost requirements of the evaporator coil. The operation of the dehumidifier and regenerators above atmospheric pressure with subsequent expansion to atmospheric pressure will provide dew points below 32° F. Thus, by using this technique, dehumidification capacity can be approximately doubled. Condenser coils of the refrigerator can be cooled by reevaporation of the water which has been removed and heat exchange with outside air or another cold water supply.

Figure 5:
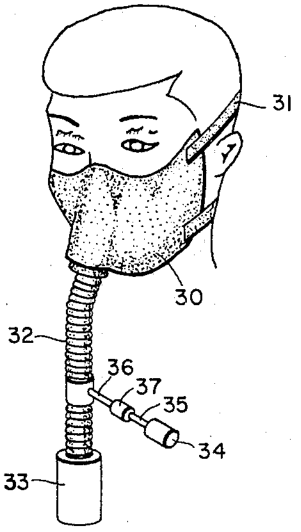
FIGURES 5 and 6 are gas mask embodiments of the invention where the unusual blending effect of a separate gas stream is used to purge the gas canister.

FIGURE 5 shows one embodiment of the invention as applied to a gas mask. The face piece of the mask 30 is adapted to seal the nose and mouth from the environment surrounding the wearer. Straps 31 hold the face piece to the face. Conduit 32 connects the face piece 30 to canister 33. Canister 33 is adapted to hold materials selective to pollutants such as poison gases.

Supplementary canister 34 is connected to conduit 32 through supplementary conduits 35, 36 and check valve 37. Check valve 37 passes gas only on exhalation. Thus, on exhalation a quantity of air is drawn into supplementary canister 34, where it is purified and allowed to pass through conduits 35, 36 and check valve 37 where it mixes with exhaled breath in conduit 32. The effect is that of a net driving force out of canister 33, thus serving to continuously regenerate canister 33. Supplementary canister 34 is approximately $\frac{1}{10}$ to $\frac{1}{5}$ the size of canister 33 and can be discarded when spent.

Figure 6:
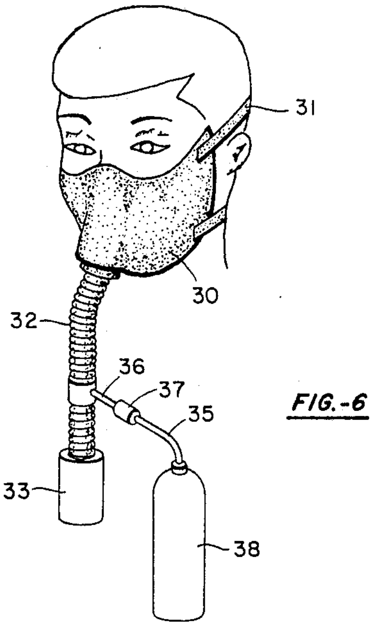

FIGURE 6 shows a gas mask similar to that of FIGURE 5 except that the source of supplemental purified gas is from storage tank 38. Check valve 37 is adjusted so that flow from storage tank 38 occurs only upon exhalation. The amount of gas from tank 38 is about 5 to 20 vol. percent of that exhaled.

Figure 7:
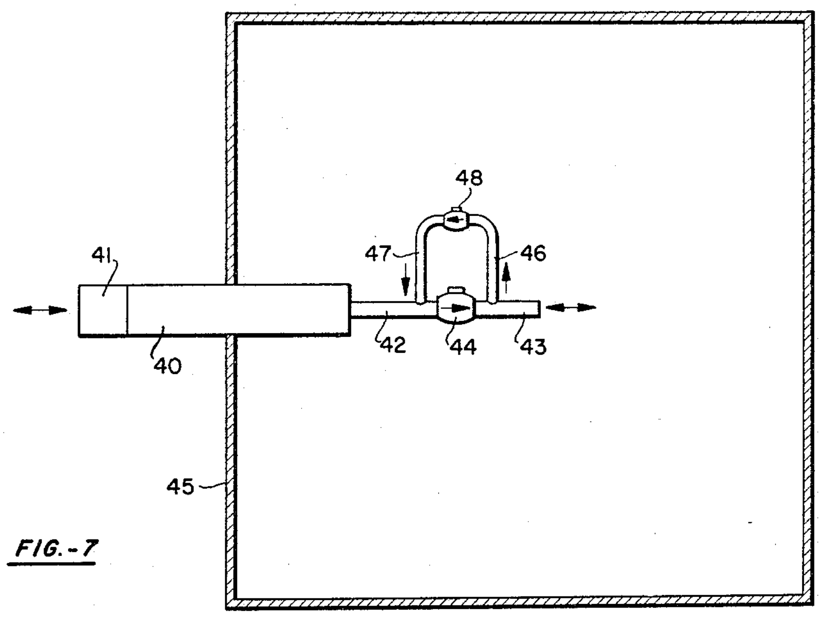
FIGURES 7 and 7A are schematics of embodiments of a single bed regenerator apparatus for ventilating according to this invention.

FIGURE 7 is one embodiment of a single vessel regenerator ventilator. The adsorbent regenerator 40 is mounted through the wall of a flexible enclosed space, i.e. a tent. A blower 41 is located on the outside end of regenerator 40. Conduits 42 and 43 and check valve 44 are attached to the inside end of regenerator 40 so as to allow a full flow of purified air into tent 45 on the ventilation cycle. On the exhaust cycle air from within the tent passes in relatively restricted flow through conduits 43, 46, 47, 42 and check valve 48. Conduits 46 and 47 can be of smaller cross section than conduits 42 and 43 or check valve 48 is smaller than check valve 44. The effect of this arrangement is that exhaust through adsorbent regenerator 40 is at a relatively lower pressure than ventilation. This tends to create a driving force out of tent 45, thus eliminating any backup of pollutants within tent 45.

Figure 7A:
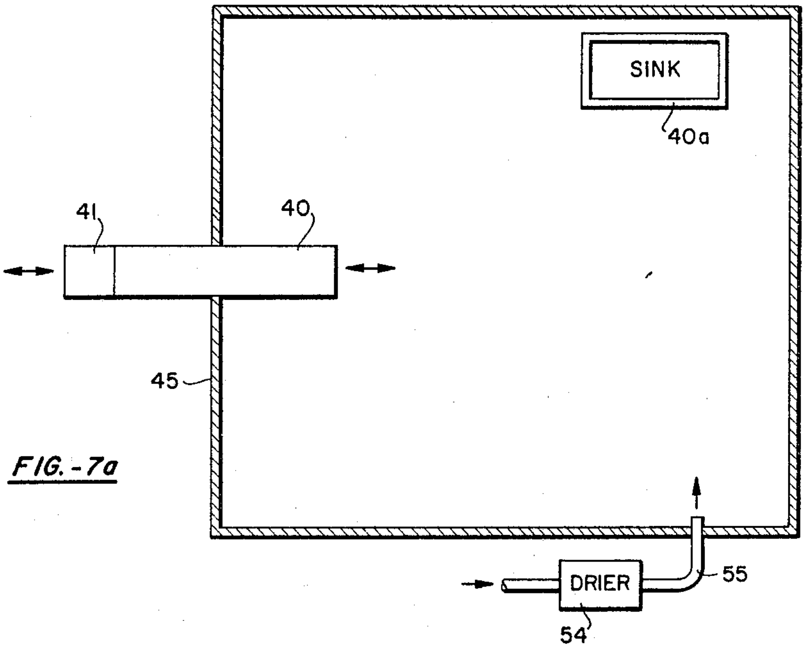

In FIGURE 7A alternate embodiments are shown where regenerator 40 has no restrictive flow arrangement. If desired, either a sink 40A or a small flow of decontaminated gas, i.e. dry air, can be used instead of restrictive flow. Either of the latter two features will also provide an outward driving force similar to that of the restricted flow of FIGURE 7.

Figure 8:
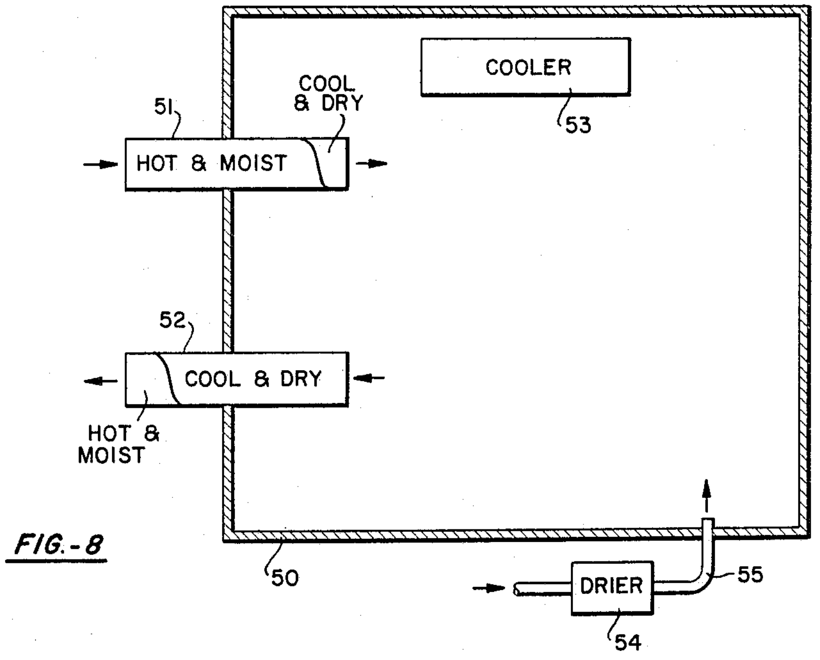
FIGURE 8 is a schematic of a room with two adsorbent regenerators mounted therein to illustrate the application of the inventive techniques to room ventilation.

FIGURE 8 is an illustration of an embodiment of the invention where a room 50 is ventilated by adsorbent regenerators 51 and 52. The conditions shown are for summer and thus there is a cooler 53 inside room 50. A small, dry air flow is supplied to room 50 through drier 54 and conduit 55 which are also shown in FIGURE 7A, in order to provide a driving force out of the room for internally generated pollutants such as water. Cooler 53 takes care of heat inputs through walls, cracks, and the like. In this embodiment, bed 51 is shown on an input step and bed 52 is shown on an exhaust step. It will be understood that this embodiment can be reversed to maintain a warm moist interior in the presence of a cold, dry exterior.

Figure 9:
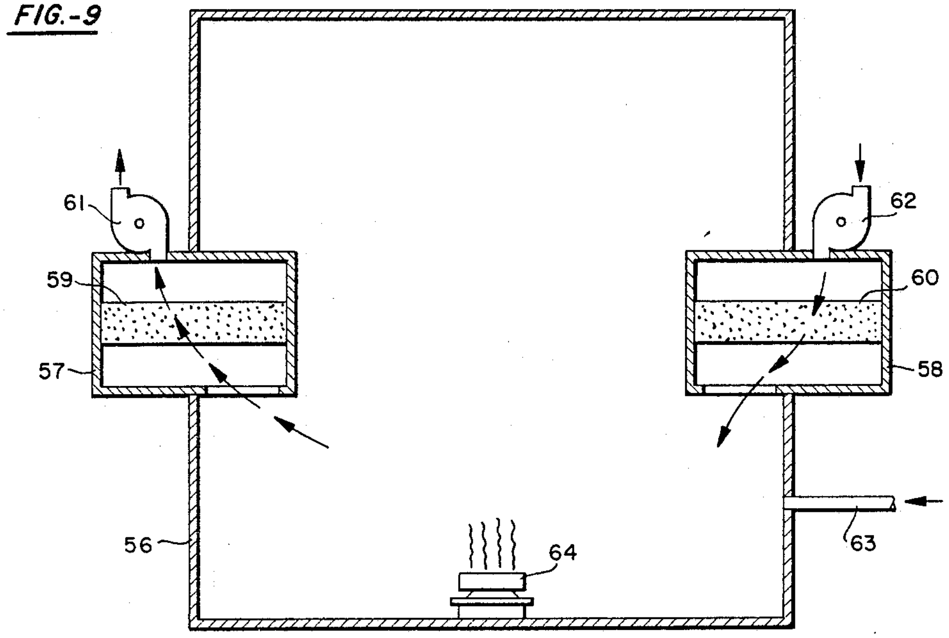
FIGURE 9 is an illustration of a 27 cu. ft. apparatus used in some of the examples of the invention.

FIGURE 9 illustrates an embodiment of the invention which was used in several of the examples herein. Box 56 is constructed of square wooden panels three feet to a side. Mounted halfway within and halfway without box 56 are adsorbent containers 57 and 58. Each adsorbent container contains active carbon beds 59 and 60 measuring 2½" x 12½" x 12½". Mounted on the top of the adsorbent containers are 75 watt reversible blowers 61 and 62. Blowers 61 and 62 communicate with the outside of box 56 so that as shown in FIGURE 9 on a given cycle, air enters blower 62, passes into the top of container 58, passes through bed 60 and out through the bottom of container 58 into box 56. At the same time air within box 56 passes through the bottom of container 57, through bed 59, through the top of container 52 and through blower 61 to the outside of box 56. Dry air, wet air, or any other gas stream can be introduced directly into box 56 through conduit 63. Hot plate 64 has a rating of 220 watts and is located within box 56 as a heat source.

The invention is further illustrated by reference to the following examples.

Figure 4:
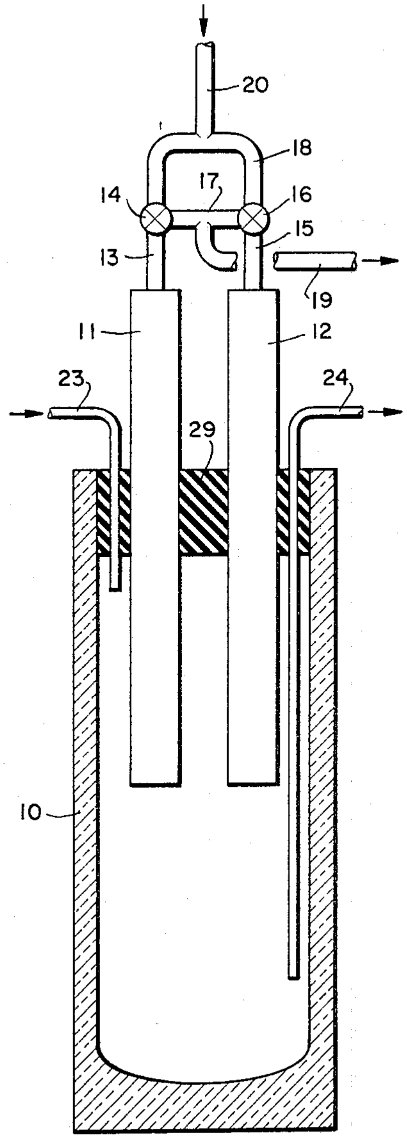
FIGURE 4 is an illustration of the apparatus which was used in several examples of this application.

In Examples 1–6 and 11 and 12, an apparatus similar to FIGURE 4 except for the differences stated in the examples, was employed. FIGURE 4 is quite similar to FIGURES 1, 2, and 3 except that the closed area is a quart "thermos bottle." Regenerator-adsorbent beds 21 and 22 are silica gel beds having a volume of 50 cc. and are 10½ inches long and ⅝ of an inch in diameter. Conduit 23 passes through stopper 26. Conduit 24 also passes through stopper 26. In the examples, the silica gel beds 21 and 22 were interchangeable with regenerators 11 and 12 which are made of the same plastic tubing but were packed with glass beads.

*Example 1*

An experiment was carried out in the apparatus of FIGURE 4 using two 11" x ⅝" plastic tubes each containing 44 cc. (53 gm.) glass beads. The tubes were inserted through holes in stopper 26 in such a manner that no passage of gas could take place between the exterior wall of the tubes and the holes in stopper 26. Valves 14 and 16 were air operated, flow reversing valves which were regulated so as to switch every 30 seconds. The dry air flow through conduit 23 was directed through and over water contained within thermos bottle 10.

The dry air was at a temperature of 80° F. The dry air flow was 0.26 s.c.f.m., 92 standard v./v./30 sec.; the residence time was 0.33 second; the water was at a temperature of about 80° F.

Utilizing the system as described, water was cooled from 80° F. to 32.5° F. Normal cooling of water by simple evaporation would be expected to be only to 50° F.

The heat leakage rate through thermos 10 was calculated to be 0.020 watt per degree. Therefore, the loss through the thermos walls was about 1.0 watt and the loss through the beds was about 0.5 watt. Approximately 1.5 watts of cooling was produced by the evaporation of the water.

*Example 2*

An experiment was carried out in the apparatus of FIGURE 4 using two silica gel beds each having a volume of 50 cc.; each bed being 10.5" x ⅝" long and containing #70 grade Davidson silica gel. It was desired to have a relatively large in-and-out flow from a moist, hot region to a cool, dry region. Flow was reversed through the beds every 15 seconds. In this experiment conduit 23 was used to introduce a flow of dry air at ambient room temperature into closed area 10. The dry air amounted to 19 vol. percent of the wet air flow into closed area 10. The moisture inside thermos 10 was reduced to 18 vol. percent of that of the outside air, i.e. feed air.

If the dry air had been just blended with the wet air the moisture in the resulting blend would have been 84% of the beginning moisture. The water content in these examples is given in terms of partial pressures measured in millimeters of mercury unless otherwise stated. In this example the water content in the feed was 26, the dry air inside the thermos 4.2 and in the effluent 22 mm. of Hg. The operation was carried out continuously through the week. Room temperature was between 70 and 95° F. at a pressure of 0 p.s.i.g. It was found from this experiment that the drying ability of the small flow of dry air was about 5.2 times its blending value, that is 22/4.2=5.2. The reason the figure 22 is used in the calculation instead of 26 is that the blending action alone will reduce the $H_2O$ partial pressure to 22. So the improvement is with respect to enhanced drying ability as compared with ordinary blending values.

*Example 3*

The conditions in this example were quite similar to the conditions in Example 2 except that conduit 24 was used to bleed out an amount of air from within thermos 10, which equaled the small, dry air flow going into thermos 10 through conduit 23. In effect this was the same as a dehumidifier within thermos 10. The volumetric flow through the beds was the same in both directions. The water content of the feed was 24.5; in the dry area 0; in the bleed flow 8.3; inside the thermos 8.3; and in the effluent 23. The operation was carried out continuously over a period of 3 days. The room temperature was 80–90° F. at 0 p.s.i.g. The drying ability of the small, dry air flow was observed to be 2.8 times its blending value, that is, 23/8.3. The data and results of Examples 2 and 3 are summarized in Table I below:

TABLE I

*Atmospheric pressure, room temp. 70–95° F. Flows reverse every 15 sec. through two beds. Each bed 50 cc. silica gel 03–70 grade*

| Operation Example 2 | | Wet Feed [1] | Dry Air Into Thermos | Inside Thermos | Effluent Normal (Blending Value) | Observed Blending Value |
|---|---|---|---|---|---|---|
| After: | | | | | | |
| 0.5 day | Flow, s.c.f.m. | 0.24 | 0.045 | | 0.285 | |
| | $H_2O$ Content, mm. Hg | 26 | 0 | 4.2 | 22 | |
| | | | | | | ×5.2 |
| 7 days | Flow, s.c.f.m. | 0.255 | 0.050 | | 0.305 | |
| | $H_2O$ Content, mm. Hg | 21.6 | 0 | 4.4 | 18 | |
| | | | | | | ×4.1 |
| Example 3 [2] | | | | | | |
| After: | | | | | | |
| 0.6 day | Flow, s.c.f.m. | 0.26 | [3] 0.049 | | 0.261 | |
| | $H_2O$ Content, mm. Hg | 23.4 | 0 | 8.0 | 22 | |
| | | | | | | ×2.7 |
| 3 days | Flow, s.c.f.m. | 0.26 | [3] 0.049 | | 0.261 | |
| | $H_2O$ Content, mm. Hg | 25.7 | 0 | 9.7 | 24 | |
| | | | | | | ×2.5 |

[1] 36 Actual v./v./15 sec. cycle, velocity: 127 ft./min., residence time: 0.4 sec.
[2] Simulating a dehumidifier within the thermos (1 quart size).
[3] 0.048 s.c.f.m. out of thermos without going through silica gel beds.

*Example 4*

In this example thermos 10 was kept at a temperature between 14° and 25° F. cooler than room temperature which was between 70–90° F. by using a cold water coil within thermos 10. The silica gel beds were identical to those described in Examples 2 and 3. Flow was reversed every 15 seconds and a dry air flow was used through conduit 23 and a bleed was used with the aid of conduit 24 as described for Example 3. The bleed stimulates dehumidification within the dry region. The run was carried out over a period of 10 days. The results and data are summarized in Table II following.

TABLE II

*Atmospheric pressure, room temperature 70–90° F. Flows reverse every 15 seconds through two beds. Each bed 50 cc. silica gel 03–07 grade*

| Operation Type 2 | | Moisture Difference: Outside → Inside: Wet Feed to Beds [1] | Dry Air into Thermos | Bleed [2] From Thermos | Effluent From Beds | Temp. Difference: Outside, Inside → Temperature, ° F.: Room | Thermos |
|---|---|---|---|---|---|---|---|
| After: | | | | | | | |
| 17 Hours | Flow, s.c.f.m. | 0.258 | 0.049 | 0.043 | 0.264 | 76 | 61 |
| | $H_2O$, mm. Hg | 19.8 | 0 | 5.6 | 19.1 | | |
| 2 Days | Flow, s.c.f.m. | 0.260 | 0.050 | 0.049 | 0.261 | 79 | 59 |
| | $H_2O$, mm. Hg | 20.0 | 0 | 5.9 | 19.5 | | |
| 10 Days | Flow, s.c.f.m. | 0.260 | 0.050 | 0.047 | 0.263 | 85 | 60 |
| | $H_2O$, mm. Hg | [3] 23.0 | 0 | 6.8 | [3] 22.2 | | |

[1] 36 Actual v./v./15 sec. cycle, velocity 127 ft./min., residence time 0.4 sec.
[2] To simulate a dehumidifier within the thermos, Δmm. Hg $H_2O$ equal minus 1.1 mm.
[3] Cooler leaving than entering, 0.5° F. max., 0.3° F. avg. Observed heat loss 0.36 cal./min. for ΔT=25° F., heat loss would be 32 cal./min. without heat exchangers. Silica gel beds are a 98.9% effective heat barrier.

Table II above, demonstrates that moisture differences and temperature differences between an enclosed space and its environment can be maintained together. It was found in carrying out this experiment that the two silica gel beds are about 98.9% effective to preserve a temperature gradient of about 25° F. The air leaving the thermos was about 0.3° F. cooler than the entering air when the temperature within thermos 10 was 25° F. cooler than the room.

This experiment also demonstrated that as a water vapor barrier the two beds were about 70% effective. The water vapor pressure was kept at about 6–7 mm. mercury inside thermos 10 when the water vapor pressure was 20 to 23 mm. mercury in the incoming air. The drying effect was about 2.8 times the blending value of the small, dry air flow. The volume flow through the adsorbent beds was the same in both directions.

*Example 5*

In order to demonstrate the drying effect of a small amount of dry air with respect to temperature gradients, the following series of runs was carried out. The dry air was introduced in area 10 through conduit 23. The series of runs illustrates that the drying effect of the small, dry air purge is even greater when a temperature gradient exists between closed area 10 and the outside.

In these runs there was no bleed through conduit 24 to stimulate dehumidification. These runs were carried out at atmospheric pressure at a temperature of about 75–95° F. and using the apparatus of FIGURE 4 as described in Example 4. Feed was at the rate of 0.26 s.c.f.m. with wet feed air having 20–25 mm. of $H_2O$ passing through each bed.

Various small, dry air back purges were used and, in some runs, the flows of air were reversed every five seconds. In others the flow was reversed every 15 seconds. In some runs temperature of the feed was about 75–95° F. and the temperature inside thermos 10 was about 58–60° F.

Figure 10:
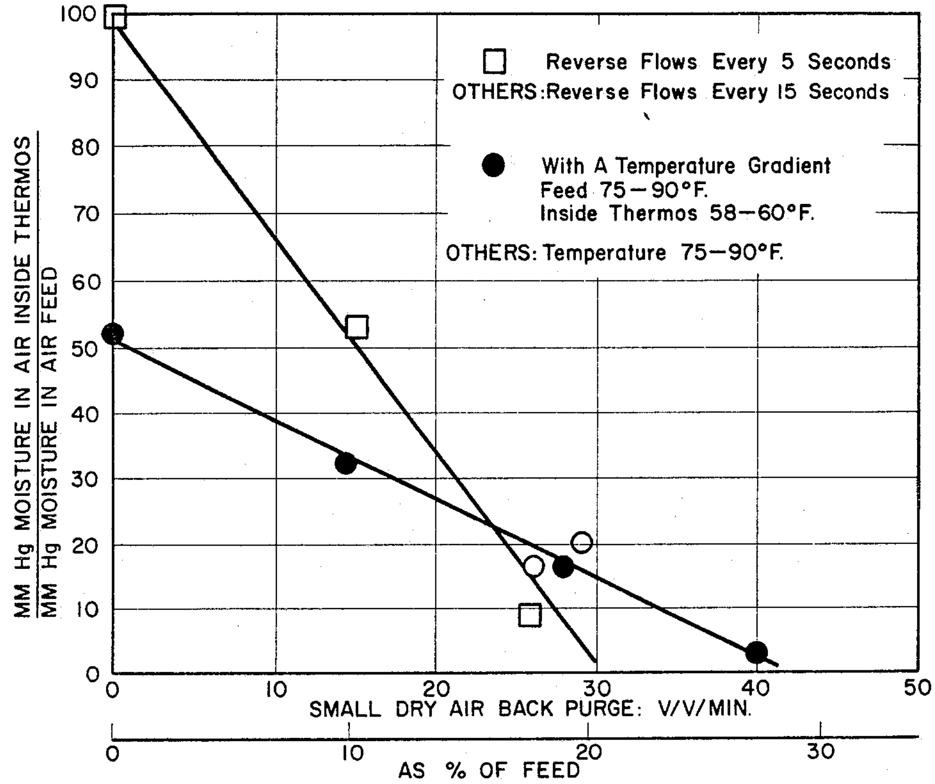

In the other runs the temperature inside and outside thermos 10 was approximately the same. The small dry air flow left thermos 10 through the adsorbent beds producing a net volume flow out of the thermos 10 which was slightly greater than the net inflow through the beds. The results are shown graphically in FIGURE 10 where the ratio of moisture in the air inside thermos 10 to the moisture in the feed air is plotted against the volume of small, dry air back purge as percent of feed expressed in volume/volume/min.

From the data it was observed that with *no temperature difference* between the thermos 10 and the incoming air a small, dry flow equal to 10 vol. percent of the wet feed reduced the moisture in the dry region within thermos 10 to half that of the wet feed. This was quite unexpected since a dry flow equal to 100% of the wet feed would normally be required to do this by a strict blending action. Thus, the drying action of the small, dry air flow was amplified ten times by its interaction with adsorbent beds 21 and 22.

Even more unexpectedly, when there was a temperature difference of about 25° F. between the inside of thermos 10 and the incoming air, the same 10 vol. percent of dry air dried the feed to about one-third of its original moisture content. This was most surprising since it would normally take a dry air flow equal to about 200% of the wet feed to blend down to a one-third moisture content. Thus, with a temperature difference the drying ability of the small, dry air flow was doubled to twenty times its blending value. Thus, directionally the larger the temperature difference the greater the drying value of the small, dry air flow.

It was further observed that when the dry air flow amounted to about 30% of the wet feed flow essentially complete drying took place.

*Example 6*

An apparatus similar to that described for FIGURE 4 was used, except that the beds were filled with 50 cc. (26 grams) each of activated carbon of 12–28 mesh obtained from the National Carbon Company. A small, moist air purge stream was flowed directly into thermos 10 and through pipe 23 and a large, dry air ventilation flow through the carbon beds was used. This was to simulate winter conditions when it is generally moist inside and dry outside. It was found that the moisture inside the thermos was the same as the moisture in the purge stream. It was not diluted by the large, dry ventilation flow at two moisture levels. These moisture levels were 19.3 and 5.4 mm. Hg $H_2O$ in the moist purge flow. The quantity of moisture purge was 25% that of the large, dry ventilation flow.

Thus, under the conditions of the example the apparatus did not demonstrate the ability to expel internally generated water vapor. The moisture backs up inside thermos due to hindered transport through carbon beds.

*Example 7*

The 27 cu. ft. box of FIGURE 9 was used in an experiment as follows:

The box was kept 27.2° F. hotter than the room by 226 watt internal heaters. At the same time, 28.3 s.c.f.m.

of cross-ventilation flow was maintained by blowers through active carbon beds. The moisture inside the box was reduced to 65% of room moisture by a 3.0 s.c.f.m. dry purge. When the same purge was wetted to 20.4 mm. Hg $H_2O$ the box moisture increased to 232% of room moisture. By ordinary flow blending, the numbers would be 91% and 136% respectively.

The conditions in the box were 10.0 mm. Hg $H_2O$ at 100° F. The heat leakage from the box was 6.0 watts/°F. The outside (room) temperature was 72.8° F. with 4.3 mm. Hg $H_2O$. The blowers were rated at 75 watts and were reversed every 15 seconds. The beds were each filled with 0.23 cubic feet of activated carbon (CXC). The beds were 2½" deep with 1.1 sq. ft. of area. They measured 12½" square. The activated carbon was 6–8 mesh (CXC—⅛") obtained from the National Carbon Co.

The total power used was 446 watts. The power needed to keep the box warm and moist with the same crossflow through open windows was calculated at 619 watts. By using the heat of the blower motors (150 watts) inside the box, the minimum power required was calculated as 281 watts. This is less than one-half of what the open window ventilation power requirements would be.

It is estimated that 84% of the heat in the gas flow was caught by the beds. 10% of the heat was lost by unbalanced flows due to the 10% purge. The beds as heat exchangers were 94% efficient in this experiment.

The above data and observations demonstrate that winter operation of a heatless ventilation system keeps the interior of the box warm, moist, and ventilated with less than one-half power needed with open windows.

*Example 8*

The box of FIGURE 9 fitted with two beds of active carbon the same as described in Example 7 was cross-ventilated at 29 s.c.f.m. Flow, in through one bed and out through the other, was reversed every 20 seconds. This limited bed throughput to about 43 v./v./20 sec. A small, dry air purge was flowed into the box to control the moisture content therein. As can be seen in the following Table III the pressure of water vapor inside box was less than in the feed. Moreover, Table III shows a comparison of experiments performed with the box and experiments performed with different packing materials in the thermos of FIGURE 4.

TABLE III

| | Inside Box (mm. Hg) | In Feed (mm. Hg) | Ratio [1] (percent) |
|---|---|---|---|
| Fig. 9 box with 2½" Carbon Beds: | | | |
| No dry purge [2] | 6.19 | 6.19 | 100 |
| Dry purge=10% feed, 30–30 sec. | 1.09 | 1.66 | 66 |
| After 3 days, 20–20 sec. | 1.24 | 2.05 | 61 |
| After 6 days, 20–20 sec. | 1.37 | 2.27 | 60 |
| (Ordinary flow blending purge and feed) | | | (91) |
| Thermos (1 qt.) 2½" Beds 11 cc. Each: | | | |
| Dry purge=10% feed, 41 v./v./6 sec.[3] | | | |
| CXC carbon, 6–8 mesh 6–6 sec. | 10.1 | 17.8 | 57 |
| Silica Gel, 03 Grade 6–6 sec. | 9.7 | 17.8 | 55 |
| Activated Alumina, 3–5 mm. 6–6 sec. | 11.2 | 17.8 | 63 |
| Cotton string tightly packed 6–6 sec [4] | 6.8 | 17.5 | 39 |
| Cotton string loosely packed 6–6 sec. | 11.7 | 17.5 | 67 |

[1] The lower the ratio the greater the limitation of $H_2O$ transport through the beds.
[2] Feed residence time in carbon bed was 0.47 sec.
[3] Feed residence time in adsorbent bed was 0.15 sec.
[4] Required 20" $H_2O$ of pressure to pass feed.

The above data demonstrate the ability of the shallow carbon beds to limit $H_2O$ transport on a 600-fold scale up over the thermos. Also the type of packing material is not as important as the contacting. Thus the tight string beds were best.

*Example 9*

One man generates about 2.3 lbs. of $CO_2$ per day, or 0.014 s.c.f.m. $CO_2$. This much $CO_2$ was flowed into the wet air purge stream entering the FIG. 9 box. Otherwise the conditions within the FIGURE 9 box being ventilated by the heatless ventilating technique of the invention were described in Example 7. Steady state $CO_2$ concentration inside the box was measured and compared with the $CO_2$ in the room outside the box. The concentration of $CO_2$ to be expected without heatless ventilation, i.e. with "open window" ventilation, i.e. ordinary flow blending, was also computed. The results are summarized as follows in Table IV.

TABLE IV

| | $CO_2$ [1] | $H_2O$ [2] |
|---|---|---|
| Outdoor Air | 300×10⁻⁶ by vol. | |
| Room Air (into box at 28.3 s.c.f.m.) | 370 | 4.3 mm. Hg |
| Small wet purge (at 3.0 s.c.f.m.) | 4,700 | 20.4 |
| Measured Inside Box 790/990 (Average) | 890 | 10.0 |
| Expected Inside 100° F. Box by ordinary flow blending | 810 [3] | 5.84 |
| Backup ratio, observed ordinary flow blending | 890/810=1.1 | 10.0/5.84=1.71 |

[1] Open window effect.
[2] Backup effect.
[3] Includes $30\times10^{-6}$ due to internal oxidation.

The above data demonstrate that the heatless ventilation technique of the invention preferentially ventilates $CO_2$, while holding back moisture and warmth. This is desirable for winter quarters. Under these test conditions, 91% of the full cross-ventilation flow was found effective in removing internally generated $CO_2$. Backup of this $CO_2$ pollutant was negligible with 2½" deep CXC carbon beds. It was quite unexpected to discover that $CO_2$ does not back up under these conditions. Water does back up under the above conditions.

*Example 10*

A man's worth of $CO_2$ (0.014 s.c.f.m.) was flowed directly into the box of FIGURE 9 along with a wet air stream. A cross-ventilation flow of 21.3 s.c.f.m. was maintained by the apparatus into and out of the hot box. The temperature inside the box was approximately 28° F. hotter than outside. Otherwise the conditions for the box were the same as described in Example 7. The concentration buildup of $CO_2$ inside the box was only 10% more than expected by the flow dilution of the ventilation air. The concentration buildup of $H_2O$ vapor was 50 to 85% more than expected by straight flow blending.

This is another demonstration of the preferential ventilation of $CO_2$ while moisture and warmth is retained inside box. This is good for winter conditioning of living quarters.

*Example 11*

Figure 11:
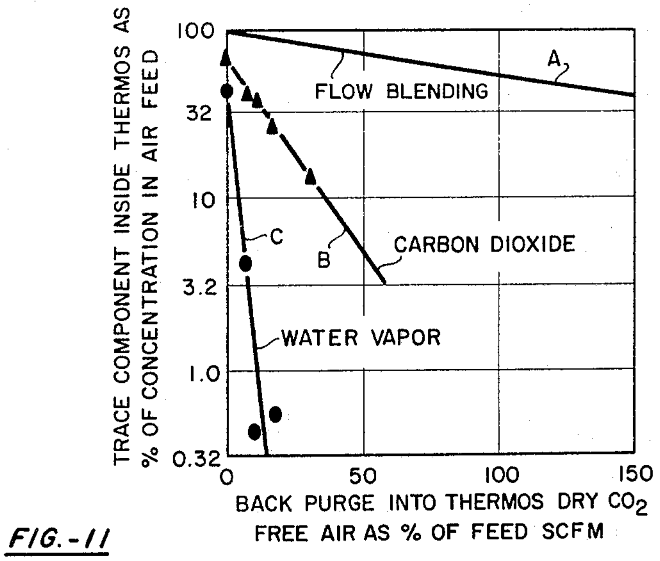
FIGURES 10, 11 and 12 are graphs illustrating various concepts and data which are described in the examples.

An apparatus similar to FIGURE 4 except that two activated carbon beds (the carbon was the same as that used in Example 6) in the stopper of a 1-quart thermos were used. Moist air with the normal $CO_2$ content (about 300 p.p.m.) was flowed into the thermos through one bed and out the other. Flow was reversed every 5 seconds. A small, dry $CO_2$ free air stream entered the thermos directly through line 23. The temperature of operation was 70–80° F.; the feed was 0.2 s.c.f.m. of moist air having a dew point of 62–72° F.; the pressure was atmospheric. It was found that the concentrations of $H_2O$ vapor and $CO_2$ within the thermos were sharply lower. For instance, $H_2O$ inside the thermos was down by a factor of 10 with 6% dry flow. $CO_2$ was down by a factor of 10 with a 35% dry flow. These two cover the major gaseous atmosphere pollutants. Particulates such as smog, gases, fallout, and other contaminants are adsorbed or disengaged by granular beds, such as adsorbent bed. Thus, heatless ventilation not only ventilates but can also relieve pollution from atmosphere-borne contaminants in hospitals, nurseries, old age homes, command hideouts, and the like. The results are graphically illustrated in FIGURE 11.

*Example 12*

In this example the ability of the heatless ventilation apparatus of FIGURE 4 to reject an external air pollutant was compared with its ability to expel the same pollutant generated internally. Ethylene was used as a pollutant. Active carbon (the same as for Example 6) was used as the adsorbent. Ethylene was added to the wet air feed to a thermos similar to that of FIGURE 4 except the beds were each filled with 50 grams of activated carbon. The amount of ethylene was 0.22 vol. percent based on feed. The ethylene inside the thermos was measured for various clean air purge rates at a steady state.

As another part of the experiment, 0.22 vol. percent of ethylene was bled directly into the thermos while the wet air feed was introduced into the carbon beds. The steady state ethylene concentration was again measured inside the thermos with various clean air purge rates. The results are summarized in FIGURE 12.

Figure 12:
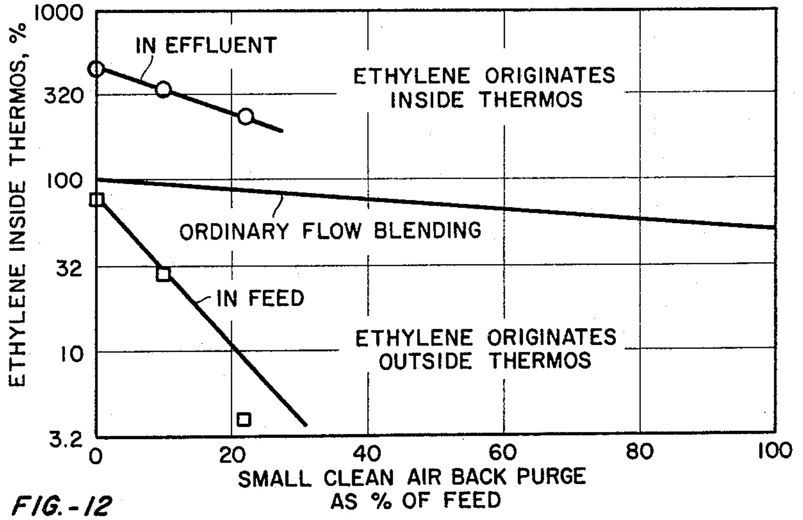

As can be seen from FIGURE 12, internally generated ethylene backs up inside the thermos due to hindered transport through carbon beds. The concentration of ethylene is several times higher than open window ventilation. On the other hand, external ethylene is held back several times more than open window ventilation. A clean air purge tends to reduce the amount of ethylene inside the thermos in both cases.

In sum, the technique of the invention provides means and processes for a large in-and-out flow of gaseous or vaporous materials between two regions while minimizing the transfer of heat and controlling the transfer of moisture between the two regions. Thus, ventilation can be accomplished without undue dissipation of the energy expended for heating, cooling or dehumidifying an enclosed area. To minimize the transfer of heat or water, the flow is reversed cyclically through the beds before either heat or moisture fronts break through. There are various techniques and modifications which can be used to maintain the ventilation. Excellent results are obtained with large temperature differences. Moreover, as has been demonstrated, there are certain materials which $CO_2$ passes through but which cause $H_2O$ to back up. Therefore, by proper selection of materials to be used in the regenerator various substances can be allowed to pass through the regenerator while others are held back or backed up.

The crux of the invention is to transport gases between two regions with a minimum transport of heat and/or minimum or maximum transport of water vapor. Moreover, the pressures in all the beds can be similar. Thus, this technique of ventilation can introduce fresh gas or air in an area while keeping moisture out and coolness in in summer and keeping moisture in and warmth in in the winter. Also, when some types of adsorbents such as activated carbon, silica gel, or molecular sieves are used, various atmospheric contaminants such as hydrocarbons, etc. can be screened out. Moreover, room odors, smoke, and other contaminants can, in some instances, be removed by adsorption on a particular adsorbent.

Although the invention has been described with a certain degree of particularity, it will be understood that numerous changes in the details of the basic inventive technique can be resorted to without departing from the spirit and scope of the invention as hereinafter claimed.

What is claimed is:

1. A method of ventilating a region comprising an enclosed space by transferring gas from said region to a second region of a different temperature with substantially no change in the temperature of the region comprising an enclosed space which comprises in combination:

(a) Flowing gas cyclically into said space through a first heat transfer zone which zone provides a passage between said regions, said zone being characterized by a heat capacity greater than the total of said gas flowing through it per cycle, (b) Simultaneously flowing gas cyclically outside of said space through a second heat transfer zone which second zone provides a passage between said regions, said second zone being characterized by a heat capacity greater than the heat capacity of the total of said gas flowing through it per cycle, (c) Simultaneously introducing a second stream of relatively dry gas as compared to the gas in said enclosed space into said enclosed space, (d) Cyclically alternating the direction of flow of gas through said first zone and said second zone, wherein the flow of gas through the zones is such that substantially no breakthrough of the heat within said zones occurs and wherein flow through a zone into one of said regions is accompanied by flow out of the same region through the other zone.

2. A method according to claim 1 wherein said gas is air.

3. A method according to claim 1 wherein said zones contain packing material.

4. A method according to claim 3 wherein said packing material is glass beads.

5. A method according to claim 1 wherein said zones contain carbon.

6. A method according to claim 1 wherein said enclosed space is a structure.

7. A method according to claim 1 wherein said enclosed space is a room in a structure.

8. A method according to claim 1 wherein said zones contain materials selective to moisture.

9. A method according to claim 8 wherein a certain portion of gas from within said closed region is allowed to escape from said region without passing through said zones.

10. A method according to claim 8 wherein said enclosed space contains means for reducing humidity therein.

11. A method according to claim 8 wherein said closed region contains a cooling means.

12. A method according to claim 1 wherein said zone contains materials selective to atmospheric pollutants.

13. A method of ventilating a region comprising an enclosed space by transferring gas from said region to a second region of a different moisture content while controlling the transfer of moisture between the two regions which comprises in combination:

(a) Flowing gas cyclically into said space through a first moisture transfer zone which zone provides a passage between said regions and is characterized by the ability to remove a substantial portion of the moisture content in the gas passing through it per cycle, (b) Simultaneously flowing gas cyclically outside of said space through a second moisture transfer zone which zone provides a passage between said regions and which zone is characterized by the ability to remove a substantial portion of the moisture contained in the gas passing through it per cycle, (c) Simultaneously introducing a second stream of relatively dry gas as compared to the gas in said enclosed space into said enclosed space, (d) Cyclically alternating the direction of flow of gas through said first and second zones, wherein the flow of gas through the zones is such that substantially no breakthrough of the moisture within said zones occurs and wherein flow through a zone into one of said regions is accompanied by flow out of the same region through the other zone.

14. A method according to claim 13 wherein said zones also serve as heat transfer zones and the flow of gas through said zones is such that there is substantially no breakthrough of the heat front within said zones.

15. A method according to claim 14 wherein said zones contain carbon.

16. A method according to claim 13 wherein said gas is substantially air.

17. A method according to claim 13 wherein said zones contain carbon.

18. A method according to claim 13 wherein said zones contain silica gel.

References Cited by the Examiner

UNITED STATES PATENTS

| | | | |
|---|---|---|---|
| 1,496,670 | 6/1924 | Floyd | 98—32 |
| 1,679,116 | 7/1928 | Dragger | 128—140 |
| 1,808,177 | 6/1931 | Putter | 128—140 |
| 1,926,295 | 9/1933 | Martin | 98—32 |
| 2,732,027 | 1/1956 | Wallin | 55—162 |
| 2,955,673 | 10/1960 | Kennedy et al. | 55—62 X |
| 3,182,435 | 5/1965 | Axt | 55—62 X |
| 3,192,686 | 7/1965 | Berkey et al. | 55—62 X |

REUBEN FRIEDMAN, *Primary Examiner.*

RICHARD A. GAUDET, *Examiner.*

W. E. KAMP, *Assistant Examiner.*